United States Patent
Al Kaabi et al.

(10) Patent No.: US 11,034,897 B1
(45) Date of Patent: Jun. 15, 2021

(54) SCHEME FOR SUPERCRITICAL WATER PROCESS FOR HEAVY OIL UPGRADING

(71) Applicant: Saudi Arabian Oil Company, Dhahran (SA)

(72) Inventors: Khalid Al Kaabi, Dhahran (SA); Ki-Hyouk Choi, Dhahran (SA); Mazin M. Fathi, Dammam-Shula (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 16/864,134

(22) Filed: Apr. 30, 2020

(51) Int. Cl.
| | |
|---|---|
| *C10G 49/00* | (2006.01) |
| *B01F 3/08* | (2006.01) |
| *B01J 3/00* | (2006.01) |
| *C10G 49/22* | (2006.01) |

(52) U.S. Cl.
CPC .......... *C10G 49/007* (2013.01); *B01F 3/0807* (2013.01); *B01F 3/088* (2013.01); *B01J 3/008* (2013.01); *C10G 49/22* (2013.01); *B01F 2003/0842* (2013.01); *C10G 2300/1011* (2013.01); *C10G 2300/1044* (2013.01); *C10G 2300/4006* (2013.01); *C10G 2300/4012* (2013.01); *C10G 2300/805* (2013.01)

(58) Field of Classification Search
USPC .................. 208/131, 179, 428; 585/240, 800
See application file for complete search history.

(56) References Cited

U.S. PATENT DOCUMENTS

| | | | |
|---|---|---|---|
| 4,634,801 A | 1/1987 | Kocal et al. | |
| 7,144,498 B2 | 12/2006 | McCall et al. | |
| 8,137,555 B2 | 3/2012 | Kale | |
| 8,287,732 B2 | 10/2012 | Chen | |
| 8,673,028 B2 * | 3/2014 | Savage | C11C 3/02 44/388 |

(Continued)

FOREIGN PATENT DOCUMENTS

| | | |
|---|---|---|
| WO | 2007128800 A1 | 11/2007 |
| WO | 2010033512 A1 | 3/2010 |

OTHER PUBLICATIONS

Duan et al., "Upgradining of crude algal bio-oil in supercritical water", Bioresource Technology 102(2011) pp. 1899-1906 (Year: 2011).*

(Continued)

*Primary Examiner* — Nina Bhat
(74) *Attorney, Agent, or Firm* — Bracewell LLP; Constance G. Rhebergen

(57) ABSTRACT

A process for producing an upgraded oil blend, the process comprising the steps of introducing the combined stream to a supercritical reactor, wherein a volumetric ratio of water to oil in the combined stream is in the range between 10:1 and 2:1; reacting the combined stream in the supercritical water reactor to produce a reactor effluent, wherein the oil undergoes conversion reactions in the supercritical reactor such that the reactor effluent comprises upgraded bio-oil and upgraded heavy oil; reducing a temperature of the reactor effluent to produce a cooled effluent; operating the soaker to (Continued)

produce a product effluent, wherein a temperature in the soaker is between 250° C. and 350° C., wherein decarboxylation reactions occur in the soaker; and separating the product effluent in the separation unit to produce and the upgraded oil blend, wherein the upgraded oil blend comprises upgraded bio-oil and upgraded heavy oil.

20 Claims, 4 Drawing Sheets

(56) References Cited

U.S. PATENT DOCUMENTS

| | | | |
|---|---|---|---|
| 9,670,419 B2 * | 6/2017 | Choi | B01J 3/008 |
| 9,732,469 B2 | 8/2017 | Powell et al. | |
| 9,803,146 B2 | 10/2017 | Kumar et al. | |
| 9,914,885 B2 * | 3/2018 | Choi | C10G 45/26 |
| 9,920,258 B2 * | 3/2018 | Choi | C10G 75/04 |
| 10,543,468 B2 * | 1/2020 | Choi | C10G 31/08 |
| 10,577,546 B2 * | 3/2020 | Choi | C10G 53/06 |
| 10,640,715 B2 * | 5/2020 | Choi | C10G 11/10 |
| 10,752,847 B2 * | 8/2020 | Choi | C10G 47/32 |
| 10,870,805 B2 * | 12/2020 | Choi | C10G 55/04 |
| 10,927,313 B2 * | 2/2021 | Choi | C10G 7/08 |
| 2007/0267327 A1 | 11/2007 | Boakye | |
| 2012/0055077 A1 | 3/2012 | Savage et al. | |
| 2013/0140214 A1 | 6/2013 | Choi | |
| 2013/0184505 A1 * | 7/2013 | Maxwell | C10G 3/46 585/240 |
| 2014/0288338 A1 | 9/2014 | Radlein et al. | |
| 2016/0348009 A1 * | 12/2016 | Kim | C10L 1/04 |
| 2017/0240819 A1 * | 8/2017 | Snow | C10G 11/00 |

OTHER PUBLICATIONS

"Decomposition of a long chain saturated fatty acid with some additives in hot compressed water", Energy Conversion and Management 47, 2006, 3344-3350.

"Catalytic Hydrodesulfurization of Dibenzothiophene through Partial Oxidation and a Water-Gas Shift Reaction in Supercritical Water", Ind. Eng. Chem. Res., 1998, 37 (7), pp. 2634-2638.

"Feedstocks for fuels and chemicals from algae: Treatment of crude bio-oil over HZSM-5", Algal Research 2, 2013, 154-163.

"Hydrolysis of esters in subcritical and supercritical water", Journal of Supercritical Fluids 16, 2000, 189-206.

"Influence of different factors on the stability of biodiesel: A review", Renewable and Sustainable Energy Reviews 30 (2014) 154-163.

"Biomass gasification in near- and super-critical water: Status and prospects", 3-Biomass and Bioenergy 29 (2005) 269-292.

Bo Zhang et al., Conversion of Agricultural Residues to Bio-crude Oil by Supercritical Water, 2009 ASABE Annual International Meeting, Paper No. 096610 (Jun. 2009).

Ferran de Miguel Mercader, Pyrolysis Oil Upgrading for Co-Processing in Standard Refinery Units, Ph.D. Thesis University of Twente (2010).

Progress in Natural Science 19, 2009, 273-28.

The Journal of Supercritical Fluids 133, 2018, 674-682.

Zia Abdullah et al., Final Technical Report: Upgrading of Bio-Oil Produced by Pyrolysis, Battelle Memorial Institute (Jun. 30, 2015).

"Natural Hydrogen Donors in Petroleum Resids", Energy Fuels, 21, 1199, 2007.

"Overview of Applications of Biomass Fast Pyrolysis Oil", Energy & Fuels 2004, 18, 590-598.

\* cited by examiner

US 11,034,897 B1

SCHEME FOR SUPERCRITICAL WATER PROCESS FOR HEAVY OIL UPGRADING

TECHNICAL FIELD

Disclosed are methods for upgrading oil. Specifically, disclosed are methods and systems for concurrent upgrading of bio-oil and heavy oil.

BACKGROUND

Given the increasingly stringent environmental regulations on fossil fuels, new and innovative technological solutions need to be developed to sustain the oil market and meet the demand for petroleum products. One such promising solution is the processing and upgrading of heavy oils using water at supercritical conditions. What is unique about supercritical water as a reaction medium is the degree of control that it provides over its properties, where the dielectric constant can be fine-tuned by varying temperature and pressure. The low dielectric constant of supercritical water makes it akin to common organic solvents such as toluene and dichloromethane. Supercritical water has been shown to be an effective solvent or diluent in thermal upgrading of heavy oils. Supercritical water can dissolve a wide range of hydrocarbons, and as a result, allows for simultaneous upgrading of heavy oil and suppression of coke formation. Furthermore, supercritical water processes can upgrade heavy oil at high severity, in other words high temperature and pressure, while suppressing over-cracking reactions that intensify gas and coke production. To improve supercritical water processes additional steps, such as additive utilization, are needed to widen the product slate, meet environmental regulations, and improve product properties.

Various types of bio-oils and bio-fuels have been prepared and commercialized. First generation bio-fuels can be produced from arable crops. For example, bio-ethanol is prepared from saccharides such as corn and sugarcane, while bio-diesel is prepared from vegetable oil. Non-food biomass, such as microalgae, can be used to produce biofuels. However, bio-fuels tend to have poor thermal-stability, poor long-term storage stability, high water content (15-30% weight %), low miscibility with conventional fossil fuels, and high acidity that could result in corrosion. These disadvantages are caused by the high oxygen content found in bio-oils (35-40 weight %), the presence of hydrophilic compounds, and the high content of carboxylic acids. Furthermore, long-term storage of bio-oils can result in increased viscosity and phase separation due to reactions between pyrolyzed lignin and bio-oil.

SUMMARY

Disclosed are methods for upgrading oil. Specifically, disclosed are methods and systems for concurrent upgrading of bio-oil and heavy oil.

In a first aspect, a process for producing an upgraded oil blend is provided. The process includes the steps of introducing the combined stream to a supercritical reactor, where a volumetric ratio of water to oil in the combined stream is in the range between 10:1 and 2:1, where oil includes heavy oil and bio-oil and reacting the combined stream in the supercritical water reactor to produce a reactor effluent, where the supercritical reactor is at a temperature between 390° C. and 450° C. and a pressure between 23 MPa and 27 MPa, where supercritical water reactor is in the absence of an external supply of catalyst, where the oil undergoes conversion reactions in the supercritical reactor such that the reactor effluent includes upgraded bio-oil and upgraded heavy oil. The process further includes the steps of introducing the reactor effluent to a heat exchanger, reducing a temperature of the reactor effluent to produce a cooled effluent, where the cooled effluent is at a temperature between 250° C. and 350° C., introducing the cooled effluent to a soaker, operating the soaker to produce a product effluent, where a temperature in the soaker is between 250° C. and 350° C., where decarboxylation reactions occur in the soaker, where conversion reactions occur in the soaker, introducing the product effluent to a separation unit, and separating the product effluent in the separation unit to produce a gas product, a recovered water, and the upgraded oil blend, where the upgraded oil blend includes upgraded bio-oil and upgraded heavy oil.

In certain aspects, the process further includes the steps of introducing supercritical water to a first stage mixer, where the supercritical water includes supercritical water, introducing a bio-oil feed to the first stage mixer, where the bio-oil feed includes bio-oil, where a temperature of the bio-oil feed is less than 300° C. and a pressure is between 23 MPa and 27 MPa, mixing the supercritical water and the bio-oil feed in the first stage mixer to produce a bio-oil emulsion, introducing the bio-oil emulsion to a second stage mixer, introducing a heavy oil feed to the second stage mixer, where the heavy oil feed includes heavy oil, where a temperature of the heavy oil feed is less than 250° C. and a pressure is between 23 MPa and 27 MPa, and mixing the bio-oil emulsion and the heavy oil feed in the second stage mixer to produce the combined stream. In certain aspects, the process further includes the steps of introducing a supercritical water to the first stage mixer, where the supercritical water includes supercritical water, introducing a heavy oil feed to a first stage mixer, where the heavy oil feed includes heavy oil, where a temperature of the heavy oil feed is less than 250° C. and a pressure is between 23 MPa and 27 MPa, mixing the supercritical water and the heavy oil feed in the first stage mixer to produce an oil-water emulsion, introducing the oil-water emulsion to a second stage mixer, introducing a bio-oil feed to the second stage mixer, where the bio-oil feed includes bio-oil, where a temperature of the bio-oil feed is less than 300° C. and a pressure is between 23 MPa and 27 MPa, and mixing the heavy oil emulsion and the bio-oil feed in the second stage mixer to produce the combined stream. In certain aspects, the process further includes the steps of introducing a bio-oil feed to a first stage mixer, where the bio-oil feed includes bio-oil, where a temperature of the bio-oil feed is less than 300° C. and a pressure is between 23 MPa and 27 MPa, introducing a heavy oil feed to the first stage mixer, where the heavy oil feed includes heavy oil, where a temperature of the heavy oil feed is less than 250° C. and a pressure is between 23 MPa and 27 MPa, mixing the bio-oil feed and the heavy oil feed in the first stage mixer to produce a mixed oil, introducing the mixed oil to a second stage mixer, introducing a supercritical water to the second stage mixer, where the supercritical water includes supercritical water, and mixing the mixed oil emulsion and the supercritical water in the second stage mixer to produce the combined stream. In certain aspects, the process where the step of separating the product effluent in the separation unit includes the steps of introducing the soaker effluent to a gas-liquid separator, separating the soaker effluent to produce a gas product and a liquid stream, introducing the liquid stream to an oil-water separator, separating the liquid stream to produce the upgraded oil blend and the recovered water. In certain aspects, the bio-oil feed includes bio-oil produced from a biomass raw material, where the biomass raw material is selected from the group consisting of lignocellulosic biomass, herbaceous biomass, fine algae, large algae, food biomass, agricultural waste, municipal waste, sunflower oil, palm oil, canola oils, and combinations of the same. In certain aspects, the heavy oil in the heavy oil feed is selected from the group consisting of atmospheric distillation residue, vacuum distillation residue, residue streams from refinery, petrochemical plants, and coal liquefaction streams, upgraded oil blends recovered from oil or tar sands, bituminous oils, hydrocarbon streams from oil refinery processes, product streams from steam cracking processes, and combinations of the same. In certain aspects, the heavy oil feed is in the absence of bio-oil. In certain aspects, the process further includes the steps of increasing a pressure of a heavy oil stream in a heavy oil pump to produce a pressurized heavy oil, where the pressurized heavy oil is at a pressure between 23 MPa and 27 MPa, increasing a temperature of the pressurized heavy oil in a heavy oil heater to produce the heavy oil feed, increasing a pressure of a bio-oil stream in a bio-oil pump to produce a pressurized bio-oil, where the pressurized bio-oil is at a pressure between 23 MPa and 27 MPa, increasing a temperature of the pressurized bio-oil in a bio-oil heater to produce the bio-oil feed, increasing a pressure of a water feed to produce a pressurized water, where the pressurized water is at a pressure between 23 MPa and 27 MPa, and increasing a temperature of the pressurized water to produce the supercritical water, where the supercritical water is at a temperature between 400° C. and 550° C.

In a second aspect, a system for producing an upgraded oil blend is provided. The system includes a supercritical reactor, the supercritical reactor configured to maintain reactions of a combined stream to produce a reactor, where a volumetric ratio of water to oil in the combined stream is in the range between 10:1 and 2:1, where oil includes heavy oil and bio-oil, where the supercritical reactor is at a temperature between 390° C. and 450° C. and a pressure between 23 MPa and 27 MPa, where supercritical water reactor is in the absence of an external supply of catalyst, where the oil undergoes conversion reactions in the supercritical reactor such that the reactor effluent includes upgraded bio-oil and upgraded heavy oil, a heat exchanger fluidly connected to the supercritical reactor, the heat exchanger configured to reduce a temperature of the reactor effluent to produce a cooled effluent, where the cooled effluent is at a temperature between 250° C. and 350° C., a soaker fluidly connected to a heat exchanger, the soaker configured to maintain reactions of the cooled effluent to produce a product effluent, where a temperature in the soaker is between 250° C. and 350° C., where decarboxylation reactions occur in the soaker, where conversion reactions occur in the soaker, and a separation unit, the separation unit configured to separate the product effluent to produce a gas product, a recovered water, and the upgraded oil blend, where the upgraded oil blend includes upgraded bio-oil and upgraded heavy oil.

In certain aspects, the system further includes a first stage mixer configured to mix supercritical water and a bio-oil feed to produce a bio-oil emulsion, where the supercritical water includes supercritical water, where the bio-oil feed includes bio-oil, where a temperature of the bio-oil feed is less than 300° C. and a pressure is between 23 MPa and 27 MPa, and a second stage mixer fluidly connected to the first stage mixer, the second stage mixer configured to mix the bio-oil emulsion and a heavy oil feed to produce the combined stream, where the heavy oil feed includes heavy oil, where a temperature of the heavy oil feed is less than 250° C. and a pressure is between 23 MPa and 27 MPa. In certain aspects, the system further includes a first stage mixer configured to mix supercritical water and a heavy oil feed to produce an oil-water emulsion, where the supercritical water includes supercritical water, where the heavy oil feed includes heavy oil, where a temperature of the heavy oil feed is less than 250° C. and a pressure is between 23 MPa and 27 MPa, and a second stage mixer fluidly connected to the first stage mixer, the second stage mixer configured to mix the oil-water emulsion and a bio-oil feed to produce the combined stream. In certain aspects, the system further includes a first stage mixer configured to mix a bio-oil feed and a heavy oil feed to produce a mixed oil, where the bio-oil feed includes bio-oil, where a temperature of the bio-oil feed is less than 300° C. and a pressure is between 23 MPa and 27 MPa, where the heavy oil feed includes heavy oil, where a temperature of the heavy oil feed is less than 250° C. and a pressure is between 23 MPa and 27 MPa, and a second stage mixer fluidly connected to the first stage mixer, the second stage mixer configured to mix the mixed oil and a supercritical water, where the supercritical water includes supercritical water. In certain aspects, the separation unit includes a gas-liquid separator, the gas-liquid separator configured to separate the soaker effluent to produce a gas product and a liquid stream, and an oil-water separator fluidly connected to the gas-liquid separator, the oil-water separator configured to separate the liquid stream to produce the upgraded oil blend and the recovered water.

In certain aspects, the system further includes a heavy oil pump, the heavy oil pump configured to increase a pressure of a heavy oil stream to produce a pressurized heavy oil, where the pressurized heavy oil is at a pressure between 23 MPa and 27 MPa, a heavy oil heater fluidly connected to the heavy oil pump, the heavy oil heater configured to increase a temperature of the pressurized heavy oil to produce the heavy oil feed, a bio-oil pump, the bio-oil pump configured to increase a pressure of a bio-oil stream to produce a pressurized bio-oil, where the pressurized bio-oil is at a pressure between 23 MPa and 27 MPa, a bio-oil heater fluidly connected to the bio-oil pump, the bio-oil heater configured to increase a temperature of the pressurized bio-oil to produce the bio-oil feed, a water pump, the water pump configured to increase a pressure of a water feed to produce a pressurized water, where the pressurized water is at a pressure between 23 MPa and 27 MPa, and a water heater fluidly connected to the water pump, the water heater configured to increase a temperature of the pressurized water to produce the supercritical water, where the supercritical water is at a temperature between 400° C. and 550° C. In certain aspects, the first stage mixer is selected from the group consisting of a t-junction, an inline mixer, and a combination of the same, where the second stage mixer is selected from the group consisting of a t-junction, an inline mixer, and combination of the same.

In a third aspect, a process to produce an upgraded oil blend is provided. The process includes the steps of introducing a portion of supercritical water to a first stage mixer, where the supercritical water includes supercritical water, introducing a bio-oil feed to the first stage mixer, where the bio-oil feed includes bio-oil, where a temperature of the bio-oil feed is less than 300° C. and a pressure is between 23 MPa and 27 MPa, mixing the supercritical water and the bio-oil feed in the first stage mixer to produce a bio-oil emulsion, introducing the bio-oil emulsion to a first reactor unit, and reacting the bio-oil emulsion in the first reactor unit to produce a reactor outlet, where in the first reactor unit is at a temperature between 390° C. and 450° C. and a pressure between 23 MPa and 27 MPa, where the first reactor unit includes a catalyst layer. The process further includes the steps of introducing the reactor outlet to a second stage mixer, introducing a heavy oil feed to the second stage mixer, where the heavy oil feed includes heavy oil, where a temperature of the heavy oil feed is less than 250° C. and a pressure is between 23 MPa and 27 MPa, introducing the remainder of the supercritical water to the second stage mixer, mixing the reactor outlet and the heavy oil feed in the second stage mixer to produce a mixed reactor outlet, where a volumetric ratio of water to oil in the mixed reactor outlet is in the range between 10:1 and 2:1, where oil includes heavy oil, upgraded bio-oil, and bio-oil. The process further includes the steps of introducing the mixed reactor outlet to a heat exchanger, reducing a temperature of the mixed reactor outlet to produce a cooled mixed outlet, where a temperature of the cooled mixed outlet is between 20° C. and 50° C. less than the temperature of the first reactor unit, introducing the cooled mixed outlet to a second reactor unit, reacting the mixed reactor outlet in the second reactor unit to produce a product effluent, where the second reactor unit is at a temperature between 20° C. and 50° C. less than the temperature in first reactor unit and a pressure between 23 MPa and 27 MPa, where supercritical water reactor is in the absence of an external supply of catalyst, where the oil undergoes conversion reactions in the supercritical reactor such that the product effluent includes upgraded bio-oil and upgraded heavy oil, introducing the product effluent to a separation unit, and separating the product effluent in the separation unit to produce a gas product, a recovered water, and the upgraded oil blend, where the upgraded oil blend includes upgraded bio-oil and upgraded heavy oil.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
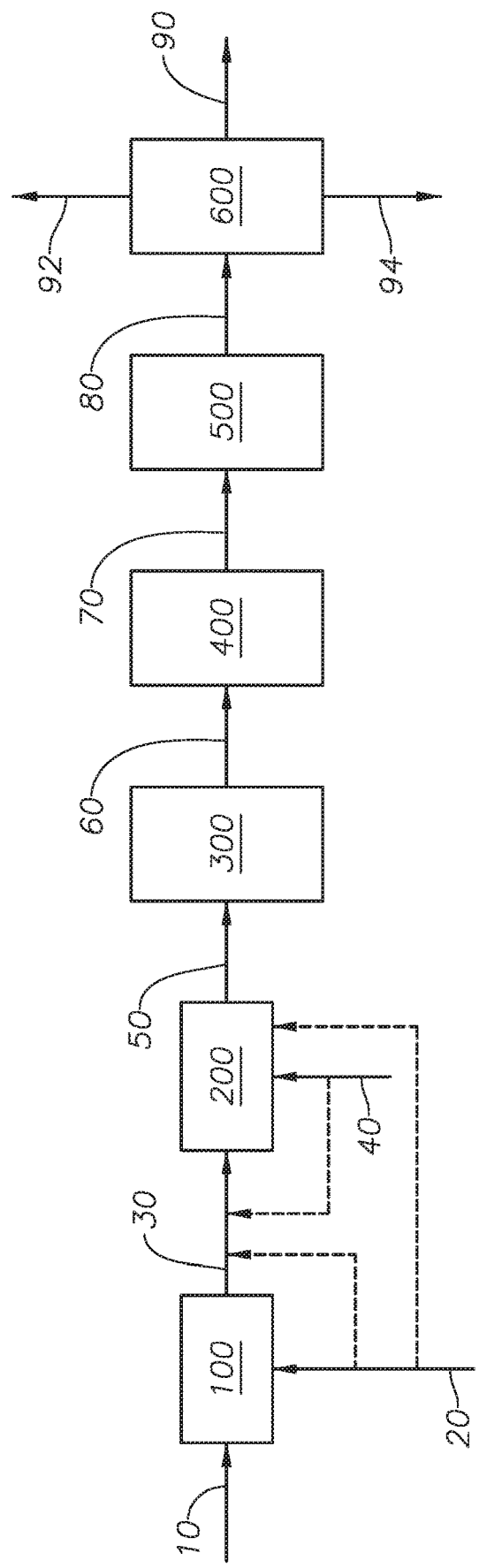
FIG. 1 provides a process diagram of an embodiment of the upgrading process.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The processes and systems described produced upgraded oil blends that contain upgraded heavy oil and upgraded bio-oil. Advantageously, bio-oil is miscible in supercritical water allowing for the formation of a strong emulsion between bio-oil and water, which enhances mixing and miscibility with the heavy oil stream.

Processing bio-oil in supercritical water has several advantages. First, bio-oil has an oxygen content of between 35 wt % and 40 wt %, which is greater than heavy oils. The increased oxygen content and increased acidity is due to the presence of carboxylic acid groups. The increased amounts of oxygen can improve upgrading of heavy oils when bio-oil and heavy oil are treated simultaneously under supercritical conditions. Second, supercritical water treatment promotes hydrogen generation, which enhances upgrading of both heavy oils and bio-oils. Hydrogen can be generated in situ from bio-oil such as in gasification reactions and water-gas shift reactions of carbon monoxide. Carbon monoxide and carbon dioxide can be produced from decarbonylation and decarboxylation reactions. The carbon monoxide can then undergo a water-gas shift reaction to produce hydrogen. Hydrogen promotes acid catalyzed desulfurization reactions causing cleavage of carbon to sulfur bonds, which can result in a greater degree of desulfurization of heavy oils. Additionally, the availability of natural hydrogen donors such as in the naphthenic fraction, such as tetralin, in heavy oils enhances the hydrotreatment of bio-oil. The increased amounts of hydrogen in supercritical water treatment can result in upgraded oil blends with increased miscibility and stability, and decreased viscosity. Finally, supercritical water treatment can increase removal of impurities that can cause instability in bio-oils. Unprocessed or "crude" bio-oil can include impurities such as oxygenates, glycerol, glycerins, and alkaline and alkaline earth metals (Na, K, Mg, Ca). These contaminants in crude bio-oil can be removed through precipitation or dissolution in supercritical water.

Advantageously, the processes and systems to produce upgraded oil blends result in upgraded oil blends with improved miscibility of heavy oils with bio-oils, improved stability of the upgraded oil blend, improved energy content, increased liquid yields, increased amounts of lighter fractions, and reduced amounts of coke. Advantageously, the processes and systems to produce upgraded oil blends include the concurrent processing of bio-oils and heavy oils. Advantageously, the processes and systems to produce upgraded oil blends can exploit the synergistic properties of heavy oil and bio-oil by upgrading them together to achieve product fuels with improved properties in contrast to simple blending, which can suffer from poor stability and will have lower degree of overall upgrading The processes and systems to produce upgraded oil blends are continuous and in the absence of batch processes and batch steps.

As used throughout, "bio-oil" or "bio-fuel" refers to energy-containing oil produced from any biomass raw material, the biomass raw material, and includes bio-diesel, bio-gasoline, and bio-ethanol. Bio-oils can include vegetable oils or animal fat oils. Examples of biomass raw materials suitable for use in producing a bio-oil include lignocellulosic biomass, herbaceous biomass, fine algae, large algae, food biomass, agricultural waste, municipal waste, sunflower oil, palm oil, canola oils, and combinations of the same. Examples of processes suitable for use in producing bio-oil from biomass raw material include thermochemical conversion, such as pyrolysis and hydrothermal liquefaction, and transesterification reactions. Bio-oil is in the absence of a bio-surfactant. In at least one embodiment, bio-oil is in the absence of microalgae.

As used throughout, "external supply of hydrogen" refers to the addition of hydrogen to the feed to the reactor or to the reactor itself. For example, a reactor in the absence of an external supply of hydrogen means that the feed to the reactor and the reactor are in the absence of added hydrogen, gas ($H_2$) or liquid, such that no hydrogen (in the form $H_2$) is a feed or a part of a feed to the reactor.

As used throughout, "external supply of catalyst" refers to the addition of catalyst to the feed to the reactor or the presence of a catalyst in the reactor, such as a fixed bed catalyst in the reactor. For example, a reactor in the absence of an external supply of catalyst means no catalyst has been added to the feed to the reactor and the reactor does not contain a catalyst bed in the reactor.

As used throughout, "miscibility" or "miscible" refers to the property of two substances dissolving in each other in all proportions to form a homogeneous solution. In other words two components that blend well together are miscible or have enhanced miscibility. Fuel stability can be tested by known standards, such as ASTM D4625 and ASTM D7060.

As used throughout, "stability" or "stable" refers to (i) the resistance to degradation due to various factors, including thermal and chemical; and (ii) the resistance to separation into pockets or layers of a blended fluid. Stable blend compositions are those that after being mixed remain mixed As used throughout, "supercritical water" refers to water at a temperature at or greater than the critical temperature of water and at a pressure at or greater than the critical pressure of water. The critical temperature of water is 373.946° C. The critical pressure of water is 22.06 megapascals (MPa). It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water-gas shift reaction. In the water-gas shift reaction, carbon monoxide and water react to produce carbon dioxide and hydrogen. The hydrogen can be transferred to hydrocarbons in desulfurization reactions, demetallization reactions, denitrogenation reactions, and combinations.

As used throughout, "coke" refers to the toluene insoluble material present in petroleum.

As used throughout, "cracking" refers to the breaking of hydrocarbons into smaller ones containing few carbon atoms due to the breaking of carbon-carbon bonds.

As used throughout, "upgrade" or "upgrading" means one or all of increasing API gravity, decreasing the amount of heteroatoms, including sulfur atoms, nitrogen atoms, metal atoms, and oxygen atoms, decreasing the amount of asphaltene, increasing the middle distillate yield, decreasing the viscosity, and combinations of the same, in a process outlet stream relative to the process feed stream. One of skill in the art understands that upgrade can have a relative meaning such that a stream can be upgraded in comparison to another stream, but can still contain undesirable components such as heteroatoms.

As used throughout, "conversion reactions" refers to reactions that can upgrade a hydrocarbon stream including cracking, isomerization, oligomerization, dealkylation, dimerization, aromatization, cyclization, desulfurization, denitrogenation, deasphalting, demetallization, and combinations of the same.

As used throughout, "well-mixed" refers to a mixture where the components are evenly distributed in each other such that there are no isolated areas or aggregating pockets of one component in another. A fluid that is "well-mixed" is a homogeneous mixture. In the context of oils, a well-mixed blend of oil does not show separation of one oil from the other.

It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Supercritical water is water at a temperature at or greater than the critical temperature of water and at a pressure at or greater than the critical pressure of water. The critical temperature of water is 373.946° C. The critical pressure of water is 22.06 megapascals (MPa). Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water-gas shift reaction. In the water-gas shift reaction, carbon monoxide and water react to produce carbon dioxide and hydrogen. The hydrogen can be transferred to hydrocarbons in desulfurization reactions, demetallization reactions, denitrogenation reactions, and combinations of the same. The hydrogen can also reduce the olefin content. The production of an internal supply of hydrogen can reduce coke formation.

Without being bound to a particular theory, it is understood that the basic reaction mechanism of supercritical water mediated petroleum processes is the same as a free radical reaction mechanism. Radical reactions include initiation, propagation, and termination steps. With hydrocarbons, initiation is the most difficult step and conversion in supercritical water can be limited due to the high activation energy required for initiation. Initiation requires the breaking of chemical bonds. The bond energy of carbon-carbon bonds is about 350 kJ/mol, while the bond energy of carbon-hydrogen is about 420 kJ/mol. Due to the chemical bond energies, carbon-carbon bonds and carbon-hydrogen bonds do not break easily at the temperatures in a supercritical water process, 380° C. to 450° C., without catalyst or radical initiators. In contrast, aliphatic carbon-sulfur bonds have a bond energy of about 250 kJ/mol. The aliphatic carbon-sulfur bond, such as in thiols, sulfide, and disulfides, has a lower bond energy than the aromatic carbon-sulfur bond.

Thermal energy creates radicals through chemical bond breakage. Supercritical water creates a "cage effect" by surrounding the radicals. The radicals surrounded by water molecules cannot react easily with each other, and thus, intermolecular reactions that contribute to coke formation are suppressed. The cage effect suppresses coke formation by limiting inter-radical reactions. Supercritical water, having a low dielectric constant compared to liquid phase water, dissolves hydrocarbons and surrounds radicals to prevent the inter-radical reaction, which is the termination reaction resulting in condensation (dimerization or polymerization). Moreover, the dielectric constant of supercritical water can be tuned by adjusting the temperature and pressure. Because of the barrier set by the supercritical water cage, hydrocarbon radical transfer is more difficult in supercritical water as compared to conventional thermal cracking processes, such as delayed coker, where radicals travel freely without such barriers.

The systems and process to produce an upgraded oil blend can include mixing in two stages or two units, such that the feed streams are not all mixed in one mixer. Mixing in stages or steps improves the homogeneity of the combined stream, which increases the interaction between the components in the different feed streams, and in turn reduces unwanted side reactions in the supercritical reactor. The heavy oil feed and the bio-oil feed have similar viscosities, but different polarities, which can make mixing them difficult. Mixing in two stages can provide sufficient mixing time to produce a well-mixed combined stream. Additionally, mixing in stages can reduce the potential for an asphaltene fraction of the heavy oil feed to precipitate into a separate phase due to the high polarity and high paraffinic content of the bio-oil feed.

The following embodiments, provided with reference to the figures, describe the process to produce an upgraded oil blend.

With reference to FIG. 1, an embodiment of the process and system to upgrade heavy oil with bio-oil using supercritical water is provided. Heavy oil feed 10 is introduced to first stage mixer 100. Heavy oil feed 10 can be any source of petroleum residue that has an API gravity of greater 32 and alternately greater than 24. Heavy oil feed 10 can include atmospheric distillation residue, vacuum distillation residue, residue streams from refinery, petrochemical plants, and coal liquefaction streams, liquid products recovered from oil or tar sands, bituminous oils, hydrocarbon streams from oil refinery processes, including visbreaking units, delayed coker units, fluid catalytic cracking units, and hydrocracking units, product streams from steam cracking processes, such as pyrolysis fuel oil, and combinations of the same. Heavy oil feed 10 is in the absence of biomass or bio-oil. In at least one embodiment, heavy oil feed 10 is a vacuum residue with T5% greater than 900° F. and alternately T5% greater than 1050° F. In at least one embodiment, heavy oil feed 10 is an atmospheric residue with T5% greater than 600° F. and alternately greater than 650° F. In at least one embodiment, heavy oil feed 10 is a fluid catalytic cracking (FCC) clarified slurry oil (CSO) having a T5% greater than 600° F. In at least one embodiment, heavy oil feed 10 is a naphtha steam cracker pyrolysis fuel oil with a T5% greater than 300° F. Heavy oil feed 10 can be at a temperature of between 50° C. and 250° C. and alternately between 150° C. and 250° C. Heavy oil feed 10 can be at a pressure of greater than about 22 MPa, alternately between about 23 MPa and about 30 MPa, and alternately between about 23 MPa and about 27 MPa.

Supercritical water 20 is introduced to first stage mixer 100. Supercritical water 20 can be from any source of demineralized water. Supercritical water 20 can have a conductivity less than 1 microSiemens per centimeter (µS/cm), alternately less than 0.5 µS/cm, and alternately less than 0.1 µS/cm. Supercritical water 20 can have a sodium content less than 5 micrograms per liter (µg/l) and alternately 1 µg/l. Supercritical water 20 can have a chloride content of less than 5 µg/l and alternately 1 µg/l. Supercritical water 20 can have less a silica content of less than 3 µg/l. Supercritical water 20 can include a surfactant. The surfactant can include any surfactant capable of improving mixing of water and oil. Examples of surfactants suitable for use include glycolic acid ethoxylate ethers, fluorosurfactants, polyethylene glycol ethers, amine acetates, ethoxylated amides, and combinations of the same. Supercritical water 20 can be at a temperature between 374° C. and 600° C., alternately between 400° C. and 550° C., and alternately greater than 400° C. Supercritical water 20 can be at a pressure of greater than about 22 MPa, alternately between about 23 MPa and about 30 MPa, and alternately between about 23 MPa and about 27 MPa. Supercritical water 20 contains supercritical water.

First stage mixer 100 can be any type of mixer capable of mixing two fluid streams, including a water stream and an oil stream and two oil streams. Examples of mixers suitable for use as first stage mixer 100 can include a t-junction and inline mixer. Oil-water emulsion 30 can be transferred to second stage mixer 200. Oil-water emulsion 30 can be at a temperature greater than 374° C. and a pressure greater than 22 MPa. Heavy oil feed 10 and supercritical water 20 can be mixed in first stage mixer 100 to produce oil-water emulsion 30.

The transfer line from first stage mixer 100 to second stage mixer 200 can have a residence time of less than 10 seconds. Maintaining a residence time of less than 10 seconds reduces the conversion of oil in the transfer line. The mixing can continue in the transfer line through induced turbulence. The transfer line can include an external heater to maintain the temperature of the fluids between first stage mixer 100 and second stage mixer 200.

Bio-oil feed 40 can be introduced to second stage mixer 200. Bio-oil feed 40 can contain bio-oil. The oxygen content of bio-oil feed 40 can be in the range between 5 wt % and 60 wt %, alternately less than or equal to 50 wt %, and alternately between 35 wt % and 40 wt %. The water content of bio-oil feed 40 can be in the range between 2 wt % and 45 wt % and alternately between 15 wt % and 30 wt %. The viscosity of bio-oil feed 40 can be in the range between 5 cP and 2500 cP measured at 40° C. and alternately between 35 cP and 1000 cP measured at 40° C. The kinematic viscosity of bio-oil feed 40 can be in the range between 0.1 mm$^2$/s and 80 mm$^2$/s and alternately between 1 mm$^2$/s and 10 mm$^2$/s. The density of bio-oil feed 40 can be in the range between 0.5 kg/l and 0.97 kg/l and alternately between 0.5 kg/l and 0.9 kg/l. The cloud point of bio-oil feed 40 can be in the range between 1° C. and 25° C. and alternately between 5° C. and 15° C. The T5% cut point of bio-oil feed 40 can be greater than 25° C. and alternately greater than 70° C. The T95% cut point of bio-oil feed 40 can less than 450° C. and alternately less than 300° C. Bio-oil feed 40 can be at a temperature between 50° C. and 300° C. and alternately between 50° C. and 250° C. Bio-oil feed 40 can be at a pressure greater than 22 MPa and alternately between 23 MPa and 27 MPa.

Figure 2:
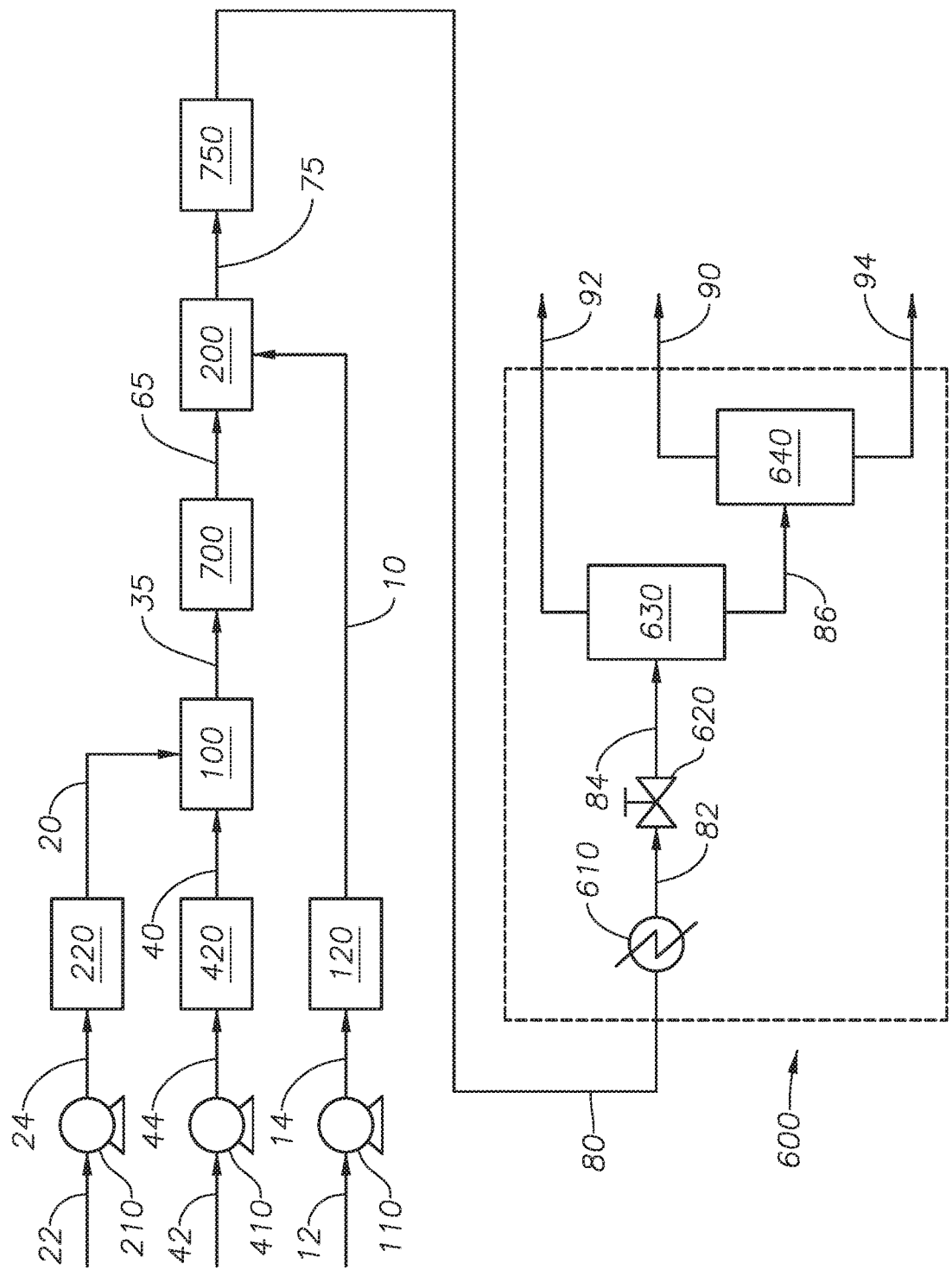
FIG. 2 provides a process diagram of an embodiment of the upgrading process.

The steps and systems to produce heavy oil feed 10, supercritical water 20, and bio-oil feed 40 can be understood by reference to FIG. 2. Heavy oil stream 12 can be introduced to heavy oil pump 110. Heavy oil stream 12 can be any source of fossil fuel-based heavy oil, including residue containing hydrocarbons. Heavy oil stream 12 can be any source of petroleum residue or heavy oil that has an API gravity of greater 32 and alternately greater than 24. Examples of petroleum residue or heavy oil suitable for use as heavy oil stream 12 can include atmospheric distillation residue, vacuum distillation residue, residue streams from refinery, petrochemical plants, and coal liquefaction streams, liquid products recovered from oil or tar sands, bituminous oils, hydrocarbon streams from oil refinery processes, including visbreaking units, delayed coker units, fluid catalytic cracking units, and hydrocracking units, product streams from steam cracking processes, such as pyrolysis fuel oil, and combinations of the same. Heavy oil stream 12 is in the absence of biomass or bio-oil.

Heavy oil pump 110 can increase the pressure of heavy oil stream 12 to produce pressurized heavy oil 14. Heavy oil pump 110 can be any type of pump capable of increasing the pressure of heavy oil stream 12. Examples of heavy oil pump 110 include a diaphragm metering pump. The pressure of pressurized heavy oil 14 is a pressure greater than the critical pressure of water, alternately greater than about 22 MPa, alternately between about 23 MPa and about 30 MPa, and alternately between 23 MPa and 30 MPa. Pressurized heavy oil 14 can be fed to heavy oil heater 120.

Heavy oil heater 120 increases the temperature of pressurized heavy oil 14 to produce heavy oil feed 10. Heavy oil heater 120 can be any type of heating device that can increase the temperature of pressurized heavy oil 14. Examples of heavy oil heater 120 can include an electric heater, a gas-fired heater, a steam heater, and a heat exchanger.

Water feed 22 can be introduced to water pump 210. Water feed 22 can be from any source of demineralized water. Supercritical water 20 can have a conductivity less than 1 microSiemens per centimeter (µS/cm), alternately less than 0.5 µS/cm, and alternately less than 0.1 µS/cm. Supercritical water 20 can have a sodium content less than 5 micrograms per liter (µg/l) and alternately 1 µg/l. Supercritical water 20 can have a chloride content of less than 5 µg/l and alternately 1 µg/l. Supercritical water 20 can have less a silica content of less than 3 µg/l.

Water pump can increase the pressure of water feed 22 to produce pressurized water 24. Water pump 210 can be any type of pump capable of increasing the pressure of water feed 22. Examples of pumps suitable for use as water pump 210 include a diaphragm metering pump. The pressure of pressurized water 24 is greater than the critical pressure of water, alternately greater than about 22 MPa, alternately between about 23 MPa and about 30 MPa, and alternately between 23 MPa and 27 MPa. Pressurized water 24 can be fed to water heater 220.

Water heater 220 heats pressurized water 24 to produce supercritical water 20. Water heater 220 can be any type of heating device that can increase the temperature of paraffin-containing water stream 12. Examples of water heater 220 can include a gas-fired heater, an electric heater, and a heat exchanger.

Bio-oil stream 42 can be introduced to bio-oil pump 410. Bio-oil stream 42 can contain bio-oil. The oxygen content of bio-oil stream 42 can be in the range between 5 wt % and 60 wt %, alternately less than or equal to 50 wt %, and alternately between 35 wt % and 40 wt %. The water content of bio-oil stream 42 can be in the range between 2 wt % and 45 wt % and alternately between 15 wt % and 30 wt %. The viscosity of bio-oil stream 42 can be in the range between 5 cP and 2500 cP measured at 40° C. and alternately between 35 cP and 1000 cP measured at 40° C. The kinematic viscosity of bio-oil stream 42 can be in the range between 0.1 mm$^2$/s and 80 mm$^2$/s and alternately between 1 mm$^2$/s and 10 mm$^2$/s. The density of bio-oil stream 42 can be in the range between 0.5 kg/l and 0.97 kg/l and alternately between 0.5 kg/l and 0.9 kg/l. The cloud point of bio-oil stream 42 can be in the range between 1° C. and 25° C. and alternately between 5° C. and 15° C. The T5% cut point of bio-oil stream 42 can be greater than 25° C. and alternately greater than 70° C. The T95% cut point of bio-oil stream 42 can less than 450° C. and alternately less than 300° C.

Bio-oil pump 410 can increase the pressure of bio-oil stream 42 to produce pressurized bio-oil 44. Bio-oil pump 410 can be any type of pump capable of increasing the pressure of bio-oil stream 42. Examples of bio-oil pump 410 include a diaphragm metering pump. The pressure of Pressurized bio-oil 44 is a pressure greater than the critical pressure of water, alternately greater than about 22 MPa, alternately between about 23 MPa and about 30 MPa, and alternately between 23 MPa and 30 MPa. Pressurized bio-oil 44 can be fed to bio-oil heater 420.

Bio-oil heater 420 increases the temperature of pressurized bio-oil 44 to produce bio-oil feed 40. Bio-oil heater 420 can be any type of heating device that can increase the temperature of pressurized bio-oil 44. Examples of bio-oil heater 420 can include an electric heater, a gas-fired heater, a steam heater, and a heat exchanger.

Returning to FIG. 1, oil-water emulsion 30 and bio-oil feed 40 can be mixed in second stage mixer 200 to produce combined stream 50. Second stage mixer 200 can be any mixer capable of mixing two fluid streams, including a water stream and an oil stream and an emulsion of oil and water and an oil stream. Examples of mixers suitable for use as second stage mixer 200 can include a t-junction and inline mixer.

Optionally, a portion of supercritical water 20 can be introduced to oil-water emulsion 30 through the transfer line between first stage mixer 100 and second stage mixer 200. Optionally, a portion of supercritical water 20 can be introduced to second stage mixer 200. Optionally, a portion of bio-oil feed 40 can be introduced to oil-water emulsion 30 through the transfer line between first stage mixer 100 and second stage mixer 200. Introducing supercritical water 20 or bio-oil feed 40 into oil-water emulsion 30 in the transfer line can improve mixing and hydrodynamics. Hydrodynamics refers to the flow and mixing behavior of fluids (especially liquids), thus improved hydrodynamics means improved mixing. Improved hydrodynamics can mean the fluid has a fully developed turbulent flow regime, where the Reynolds number is greater than 3,000 and alternately greater than 5,500.

The volumetric flow rate of supercritical water 20, heavy oil feed 10, and bio-oil feed 40 can be such that the volumetric ratio of water to oil in combined stream 50 can be 10:1, alternately in the range between 5:1 and 1:1, and alternately in the range between 4:1 and 2:1. Having more water than oil can reduce the production of coke in the supercritical reactor and increase the conversion of hydrocarbons. In at least one embodiment, the total flow rate of oil is less than 50% of the total volumetric flow rate in second stage mixer 200. Total flow rate of oil refers to the combined volumetric flow rate of bio-oil feed 40 and heavy oil feed 10. Total volumetric flow rate refers to the combined volumetric flow rate of heavy oil-feed 10, bio-oil feed 40, and supercritical water 20.

Combined stream 50 can be introduced to supercritical reactor 300.

Supercritical reactor 300 can be any type of reactor configured to maintain a reaction at the critical conditions of water. Examples of vessels suitable for use as supercritical reactor 300 can include vessel-type reactors, tubular-type reactors or combinations of the same. In at least one embodiment, supercritical reactor 300 can include a tubular-type reactor oriented in either as either downflow, upflow, or a combination of both downflow and upflow. Supercritical reactor 300 can include multiple reactors in series. The reaction residence time in supercritical reactor 300 can be between 10 seconds and 60 minutes and alternately between 5 min and 30 min. The reaction residence time in supercritical reactor 300 is determined by assuming the density of the internal fluid is that of water at the conditions of the reactor. The temperature in supercritical reactor 300 can be greater than the critical temperature of water, alternately between 380° C. and 600° C., and alternately between 390° C. and 450° C. The temperature in supercritical reactor 300 is measured by measuring the temperature of the fluid at the reactor outlet. The pressure of supercritical reactor 300 can be greater than the critical pressure of water, alternately between 23 MPa and 30 MPa, alternately between 23 MPa and 28 MPa, and alternately between 23 MPa and 28 MPa. Supercritical reactor 300 can be in the absence of an external supply of catalyst. Supercritical reactor 300 can be in the absence of an external supply of hydrogen. The dimensions of supercritical reactor 300 can be designed to have a Reynolds number over 4,000 calculated by assuming the internal fluid is water.

The oil in combined stream 50 can undergo conversion reactions in supercritical reactor 300 to produce upgraded bio-oil and upgraded heavy oil.

The fluid in supercritical reactor 300 can exit as reactor effluent 60. Reactor effluent 60 can include upgraded bio-oil, upgraded heavy oil, water, and combinations of the same. Reactor effluent 60 can contain an oil-water mixture, where the upgraded heavy oil and upgraded bio-oil are dispersed in the water. Reactor effluent 60 can contain three phases, an upgraded bio-oil phase, an upgraded heavy oil phase and a water-rich phase, containing primarily water, where the three phases are mixed together in the oil-water mixture forming a well-mixed stream.

The temperature of reactor effluent 60 can be reduced in heat exchanger 400 to produce cooled effluent 70. Heat exchanger 400 can be any type of exchanger capable of reducing the temperature of a reactor effluent stream. Examples of heat exchanger 400 can include a heat exchanger and an air cooler. Cooled effluent 70 can be at a temperature between 250° C. and 350° C., alternately between 275° C. and 325° C., alternately between 295° C. and 305° C., and alternately 300° C. Cooled effluent 70 can be introduced to soaker 500.

Soaker 500 can be any type of vessel capable of maintaining a reaction. The temperature in soaker 500 can be in the range between 250° C. and 350° C., alternately in the range between 275° C. and 325° C., alternately in the range between 295° C. and 305° C., and alternately 300° C. The pressure in soaker 500 can be greater than critical pressure of water, alternately greater than 22 MPa, and alternately between 23 MPa and 30 MPa. The water in soaker 500 is in the liquid state. The residence time in soaker 500 can be in between 1 minute and 120 minute and alternately between 10 minutes and 60 minutes. The residence time in soaker 500 is longer than the residence time in supercritical reactor 300. The exact residence time can be determined based on the temperature in soaker 500. The residence time is selected so that soaker 500 allows for extended or additional conversion of heavy oil at reaction conditions that are less severe than the conditions in supercritical reactor 300. Soaker 500 can be included when conversion in the supercritical reactor was low and additional conversion is required or when the reaction rate is slow and the additional reaction time in the soaker can increase conversion. The reduced temperature and longer residence time compared to supercritical reactor 300 in soaker 500 prevents cracking reactions. The occurrence of decarboxylation reactions is limited at supercritical water conditions. The temperature in soaker 500 can allow decarboxylation reactions to occur which can result in a greater degree of upgrading. Because the conditions in the soaker are subcritical, the ionic property of water in the soaker is higher than water at standard temperature and pressure, which favors ionic reactions, such as decarboxylation reactions. Desulfurization reactions can also occur. Soaker 500 is in the absence of cracking reactions. Product effluent 80 can be introduced to separation unit 600.

In at least one embodiment, soaker 500 can include catalyst. The catalyst can include transition metal oxides, alkali metals, and combinations of the same. The catalyst can include a catalyst support. The catalyst support can include silica, alumina, titania, zeolite, and combinations of the same. The catalyst can be present in a catalyst bed, where the catalyst bed is a fixed bed.

In at least one embodiment, the process and system to upgrade heavy oil with bio-oil using supercritical water is in the absence of soaker 500 and cooled effluent 70 can be introduced directly separation unit 600.

Separation unit 600 can be any type of separation unit capable of separating gases, oil, and water. Separation unit 600 can include a three-phase separator, a gas-liquid separator, an oil-water separator, and combinations of the same. Separation unit 600 can include equipment to reduce the temperature and pressure, including heat exchangers and pressure reducing devices. Product effluent 80 can be separated in separation unit 600 to produce upgraded oil blend 90, gas product 92, and recovered water 94.

An embodiment of separation unit 600 is described with reference to FIG. 2. Product effluent 80 can be fed to cooler 610 to produce cooled stream 82. Cooler 610 can be any device capable of reducing the temperature of product effluent 80. In at least one embodiment, cooler 610 is a heat exchanger. The temperature of cooled stream 82 can depend on the operating conditions desired for gas-liquid separator 630. The temperature of cooled stream 82 can be in the range between 50 deg C. and 350 deg C., alternately less than 374 deg C., alternately in the range between 50 deg C. and 120 deg C., and alternately less than 120 deg C. In at least one embodiment the temperature of cooled stream 82 is less than 120 deg C.

Cooled stream 82 passes through pressure reducer 620 to produce depressurized stream 84. Pressure reducer 620 can be any pressure regulating device capable of reducing fluid pressure. Examples of pressure regulating devices that can be used as pressure reducer 620 include pressure control valves, capillary elements, back pressure regulators, and combinations of the same. Pressure reducer 620 can be two or more pressure regulating devices in series. In at least one embodiment, pressure reducer 620 can be a back pressure regulator. Pressure reducer 620 reduces the pressure of cooled stream 82 to a pressure between 1 barg (0.1 MPa) and 50 barg (5 MPa), alternately between 1 barg and 10 barg (1 MPa), and alternately between 10 barg (1 MPa) and 20 barg (2 MPa).

Depressurized stream 84 is fed to gas-liquid separator 630. Gas-liquid separator 630 separates depressurized stream 84 into gas product 92 and liquid stream 86. Gas-liquid separator 630 can be a simple fractionator, such as a flash drum. Advantageously, the temperature and pressure of depressurized stream 84 are such that a flash drum can be used to separate depressurized stream 84 into the gas phase and liquid phase. Gas-liquid separator 630 can be designed to generate vapor inside. Gas product 92 includes light fractions and water vapor. Liquid stream 86 includes liquid oils and water. The composition, including the hydrocarbon composition and the amount of water, of each of gas product 92 and liquid stream 86 depends on the temperature and pressure in gas-liquid separator 630. The temperature and pressure of gas-liquid separator 630 can be adjusted to achieve the desired separation between gas product 92 and liquid stream 86.

Liquid stream 86 can be introduced to oil-water separator 640. Oil-water separator 640 can separate liquid stream 86 into upgraded oil blend 90 and recovered water 94.

In at least one embodiment, gas product 92 can be further separated to produce a water fraction and a light fractions stream. The water fraction can be separated by condensing gas product 92 at conditions such that the water vapor in gas product 92 condenses to form liquid water. The water fraction includes the liquid water. In at least one embodiment, gas product 92 can be condensed in a condenser and the liquid stream can be introduced to oil-water separator 640 so that the water can be separated from the light fractions.

Returning to FIG. 1, upgraded oil blend 90 contains a blend of upgraded bio-oil and upgraded heavy oil. Upgraded oil blend 90 contains a well-mixed stream. Upgraded oil blend 90 exhibits better stability, miscibility, and increased energy content relative to a blend of bio-oil and heavy oil that was not processed under supercritical conditions in the presence of supercritical water. Upgraded oil blend 90 contains a greater amount of light hydrocarbon fraction relative to a blend of the bio-oil feed and heavy oil feed. Upgraded oil blend 90 can have an oxygen content less than 15 wt %, alternately less than 10 wt %, and alternately less than 5 wt %. The moisture content of upgraded oil blend 90 can be less than 10 wt %, alternately less than 6 wt %, and alternately less than 2 wt %. The sulfur content can be less than 5 wt %, alternately less than 3 wt %, and alternately less than 1 wt %. Upgraded oil blend 90 can have an increased API gravity, an increased middle distillate yield, a reduced sulfur content, a reduced nitrogen content, a reduced metal content, and combinations of the same as compared to a blend of the bio-oil feed and heavy oil feed.

Recovered water 94 can be further processed to remove impurities and then recycled for use in supercritical water 20. Examples of such processes include membrane processes, advanced oxidation processes, and decomposition processes. Recovered water 94 can contain impurities. The impurities in recovered water 94 can include organic compounds, inorganic compounds, oxygenates, carbonaceous particles, and combinations of the same. The organic compounds in recovered water 94 can include light alcohols and carboxylic acids produced in the treatment of the bio-oil with supercritical water. The light alcohols can include methanol. The impurities can be removed before recycling the water. One decomposition process to remove impurities from recovered water 94 includes first removing the inorganic compounds. The inorganic compounds dissolved or dispersed in the water can be removed through a filtration system. Adding fresh water in the process can help to remove some of the inorganic compounds and prevent accumulation. Next, the temperature of the recovered water is increased to a temperature of 600° C. or greater to decompose dissolved hydrocarbons and other organic compounds, such as oxygenates. The hydrocarbon and organic compounds can be removed. In at least one embodiment, the piping transferring water from separation unit 600 can include a catalyst to enhance decomposition of dissolved hydrocarbons. Examples of catalysts include Inconel-625 mesh. In embodiments where supercritical water 20 is at a temperature of at least 600° C. the water decomposition is not required.

Figure 3:
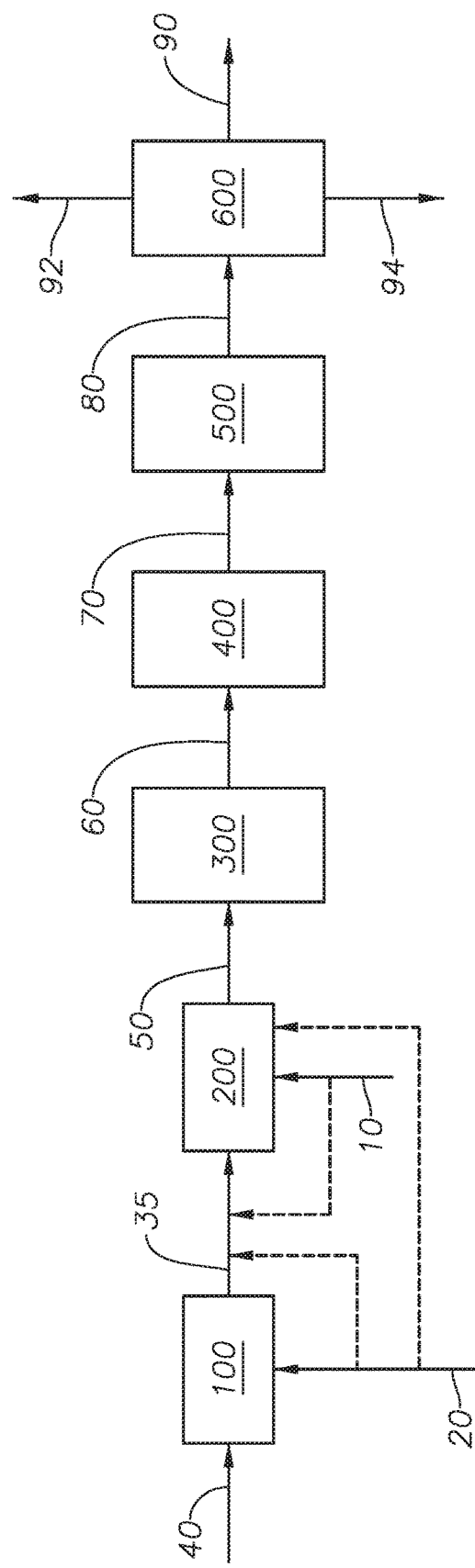
FIG. 3 provides a process diagram of an embodiment of the upgrading process.

Referring to FIG. 3, an alternate embodiment of the process to produce an upgraded oil blend is provided with reference to FIG. 1 and FIG. 2. Bio-oil feed 40 and supercritical water 20 can be introduced to first stage mixer 100. Bio-oil feed 40 and supercritical water 20 can be mixed in first stage mixer to produce bio-oil emulsion 35. Advantageously, mixing bio-oil feed 40 with supercritical water 20 prior to the step of mixing heavy oil feed 10 can result in the production of greater amounts of oxygen species that can improve upgrading of the heavy oil due to the increased oxygen content of bio-oils compared to heavy oils. The improved upgrading of heavy oil can result in an upgraded oil blend stream with improved properties. Mixing the supercritical water and bio-oil can promote hydrogen generation which can enhance upgrading and desulfurization reactions of the heavy oil, and, therefore, result in a greater degree of upgrading and desulfurization of the heavy oil. Hydrogen generation can be promoted by bio-oil due to decarbonylation reactions where carbon monoxide undergoes the water-gas shift reaction, and gasification of bio-oil hydrocarbons. Furthermore, the release of CO and $CO_2$ due to decarbonylation reactions and decarboxylation reactions can enhance upgrading of heavy oil because the presence of these molecules under supercritical water conditions has been shown to improve desulfurization and upgrading reactions. Additionally, the presence of heavy oil will reduce the water to bio-oil ratio which can reduce the degree of the aforementioned reactions, but cannot eliminate them. As such, mixing bio-oil and supercritical water first can generate higher amounts of oxygen species.

Bio-oil emulsion 35 can be introduced to second stage mixer 200. Heavy oil feed 10 can be introduced to second stage mixer 200. Bio-oil emulsion 35 and heavy oil feed 10 can be mixed in second stage mixer 200 to produce combined stream 50. Mixing bio-oil feed 40 and supercritical water 20 in first stage mixer 100 to produce bio-oil emulsion 35 can induce better mixing between heavy oil feed 10 and bio-oil emulsion due to hydrophilic and lipophilic interactions. The presence of supercritical water increases the mixing.

Optionally, a portion of supercritical water 20 can be introduced to bio-oil emulsion 35 through the transfer line between first stage mixer 100 and second stage mixer 200. Optionally, a portion of supercritical water 20 can be introduced to second stage mixer 200. Optionally, a portion of heavy-oil feed 10 can be introduced to bio-oil emulsion 35 through the transfer line between first stage mixer 100 and second stage mixer 200. Introducing supercritical water 20 or heavy oil feed 10 into bio-oil emulsion 35 in the transfer line can improve mixing and hydrodynamics.

The volumetric flow rate of supercritical water 20, heavy oil feed 10, and bio-oil feed 40 can be such that the volumetric ratio of water to oil in combined stream 50 can be 10:1, alternately between 10:1 and 2:1, alternately in the range between 5:1 and 1:1, and alternately in the range between 4:1 and 2:1. The total flow rate of oil is less than 50% of the total volumetric flow rate in second stage mixer 200. Total flow rate of oil refers to the combined volumetric flow rate of bio-oil feed 40 and heavy oil feed 10. Total volumetric flow rate refers to the combined volumetric flow rate of heavy oil-feed 10, bio-oil feed 40, and supercritical water 20.

Figure 4:
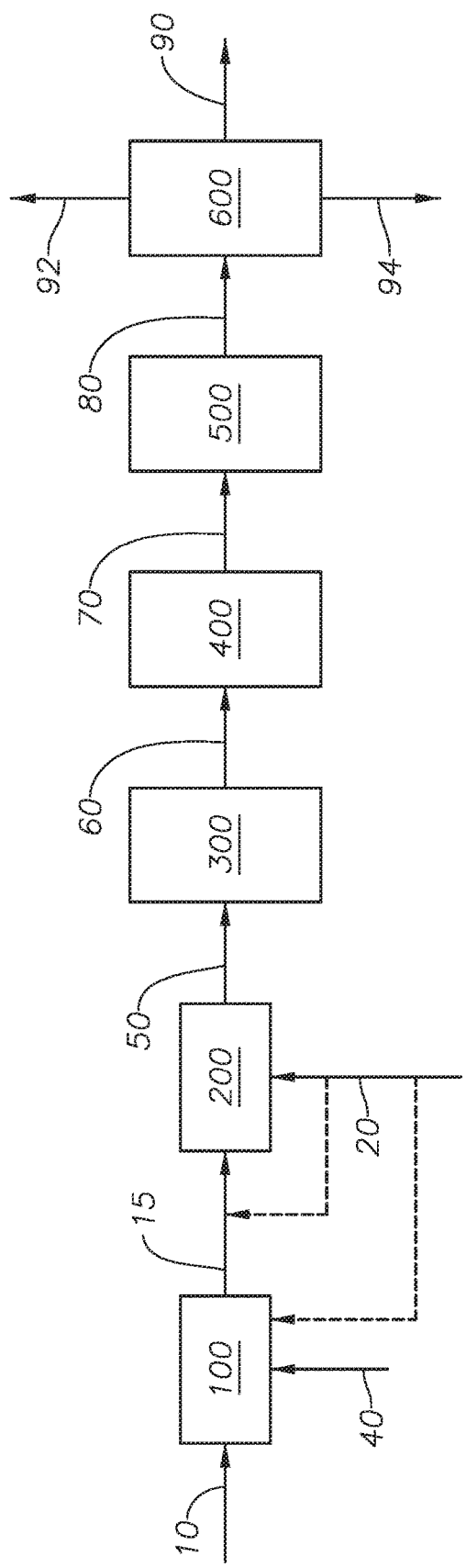
FIG. 4 provides a process diagram of an embodiment of the upgrading process.

Referring to FIG. 4, an alternate embodiment of the process to produce an upgraded oil blend is provided with reference to FIG. 1 and FIG. 2. Heavy oil feed 10 and bio-oil feed 40 can be introduced to first stage mixer 100. Heavy oil feed 10 and bio-oil feed 40 can be mixed in first stage mixer 100 to produce mixed oil 15. Mixed oil 15 can be introduced to second stage mixer 200.

Supercritical water 20 can be introduced to second stage mixer 200. Supercritical water 20 and mixed oil 15 can be mixed in second stage mixer 200 to produce combined stream 50. Optionally, a portion of supercritical water 20 can be introduced to first stage mixer 100. Optionally, a portion of supercritical water 20 can be introduced to mixed oil 15 through the transfer line between first stage mixer 100 and second stage mixer 200. Introducing supercritical water 20 into mixed oil 15 in the transfer line can improve mixing and hydrodynamics.

The volumetric flow rate of supercritical water 20, heavy oil feed 10, and bio-oil feed 40 can be such that the volumetric ratio of water to oil in combined stream 50 can be 10:1, alternately in the range between 5:1 and 1:1 and alternately in the range between 4:1 and 2:1. The total flow rate of oil is less than 50% of the total volumetric flow rate in second stage mixer 200. Total flow rate of oil refers to the combined volumetric flow rate of bio-oil feed 40 and heavy oil feed 10. Total volumetric flow rate refers to the combined volumetric flow rate of heavy oil-feed 10, bio-oil feed 40, and supercritical water 20.

Figure 5:
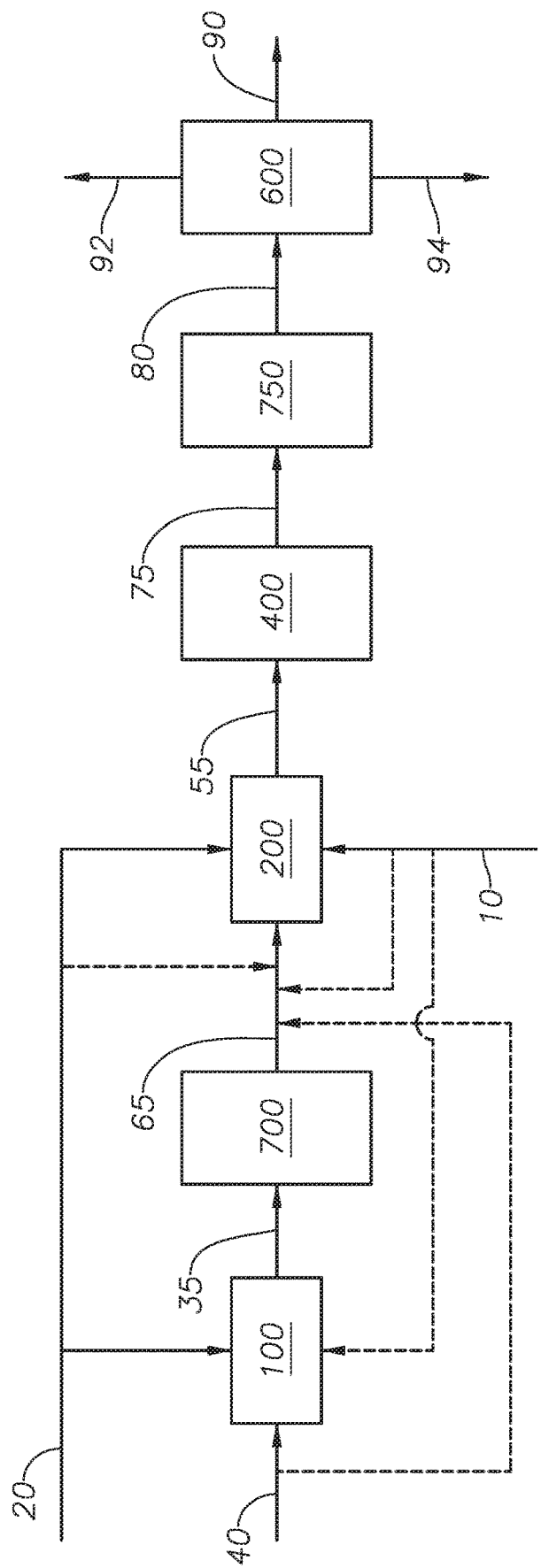
FIG. 5 provides a process diagram of an embodiment of the upgrading process.

Referring to FIG. 5, an embodiment to produce an upgraded oil blend is provided with reference to FIG. 1, FIG. 2, and FIG. 3. Bio-oil feed 40 and a portion of supercritical water 20 are introduced to first stage mixer 100. The amount of water in the portion of supercritical water 20 introduced to first stage mixer 100 can be less than or equal to 50 volume % of the total amount of water in supercritical water 20, and alternately the amount of water in the portion of supercritical water 20 can be between 10 volume % and 100 volume %. Bio-oil feed 40 and the portion of supercritical water 20 can be mixed in first stage mixer 100 to produce bio-oil emulsion 35. The volumetric ratio of water to oil in bio-oil emulsion 35 can be in the range between 5:1 and 1:1, and alternately in the range between 4:1 and 2:1. Bio-oil emulsion 35 can be introduced to first reactor unit 700.

Bio-oil emulsion 35 can be processed in first reactor unit 700 to produce reactor outlet 65. The temperature in first reactor unit 700 can be in the range between 400° C. and 500° C. and alternately in the range between 450° C. and 500° C. The pressure in first reactor unit 700 can be greater than 22 MPa and alternately in the range between 23 MPa and 30 MPa. First reactor unit 700 can include a catalyst layer. The catalyst layer can include oxides of nickel, iron, copper, zinc, lanthanide and combinations of the same. The catalyst layer can include inert carriers as support, such as alumina and silica. The catalyst layer can be in the form of nets, sponge, honeycomb, or combinations of the same. In at least one embodiment, the catalyst layer is a nickel alloy structure. In at least one embodiment, the catalyst layer includes Inconel-625.

Processing bio-oil at supercritical conditions forms less coke than heavy oil processed under the same conditions due to the reduced amounts of asphaltenic compounds, including polynuclear aromatics. Decarbonylation and decarboxylation reactions are limited in supercritical conditions without the use of catalyst, thus the presence of the catalyst layer in first reactor unit 700 can increase decarbonylation and decarboxylation reactions. Decarbonylation and decarboxylation reactions can increase amounts of hydrogen due to the availability of carbon monoxide to undergo water-gas shift reactions, which can improve desulfurization and upgrading reactions. Additionally, hydrolysis of ester and carboxylic groups can occur in first reactor unit 700.

Reactor outlet 65 can be introduced to second stage mixer 200. Heavy oil feed 10 can be introduced to second stage mixer 200 along with reactor outlet 65 and the remainder of supercritical water 20. The amount of water in the remainder of supercritical water 20 can be greater than or equal to 50 volume % of the total amount of water in supercritical water 20 and alternately the amount of water in the remainder of supercritical water 20 can be between 0 volume % and 90 volume %. In at least one embodiment, the amount of water in supercritical water 20 is split evenly with a portion introduced to first stage mixer 100 and an equal remainder introduced to second stage mixer 200. Reactor outlet 65 can be mixed with heavy oil feed 10 and the remainder of supercritical water 20 to produce mixed reactor outlet 55.

Optionally, a portion of the remainder of supercritical water 20 can be introduced to reactor outlet 65 through the transfer line between first reactor unit 700 and second stage mixer 200. Optionally, a portion of bio-oil feed 40 can be introduced to reactor outlet 65 through the transfer line between first reactor unit 700 and second stage mixer 200. Optionally, a portion of heavy oil feed 10 can be introduced to first stage mixer 100. Optionally, a portion of heavy oil feed 10 can be introduced to reactor outlet 65 through the transfer line between first reactor unit 700 and second stage mixer 200. Introducing supercritical water 20, bio-oil feed 40, or heavy oil feed 10 into reactor outlet 65 in the transfer line can improve mixing and hydrodynamics.

The volumetric flow rate of supercritical water 20, heavy oil feed 10, and bio-oil feed 40 can be such that the volumetric ratio of water to oil in combined stream 50 can be 10:1, alternately in the range between 5:1 and 1:1, and alternately in the range between 4:1 and 2:1. The total flow rate of oil is less than 50% of the total volumetric flow rate in second stage mixer 200. Total flow rate of oil refers to the combined volumetric flow rate of bio-oil feed 40 and heavy oil feed 10. Total volumetric flow rate refers to the combined volumetric flow rate of heavy oil-feed 10, bio-oil feed 40, and supercritical water 20.

Mixed reactor outlet 55 can be introduced to heat exchanger 400. The temperature of mixed reactor outlet 55 can be reduced in heat exchanger 400 to produce cooled mixed outlet 75. The temperature of cooled mixed outlet 75 can be at least 20° C. less than the temperature of first reactor unit 700, alternately at least 50° C. less than the temperature of first reactor unit 700, and alternately between 15° C. and 55° C. less than the temperature of first reactor unit 700. Cooled mixed outlet 75 can be introduced to second reactor unit 750.

In at least one embodiment, a filter with a filtering element (not shown) can be installed between first reactor unit 700 and second reactor unit 750. The filtering element can remove precipitated catalyst and impurities that precipitated from the bio-oil in first reactor unit 700.

Second reactor unit 750 can be any type of reactor configured to maintain a reaction at the critical conditions of water. Examples of vessels suitable for use as second reactor unit 750 can include vessel-type reactors, tubular-type reactors or combinations of the same. In at least one embodiment, second reactor unit 750 can include a tubular-type reactor oriented in either as either downflow, upflow, or a combination of both downflow and upflow. Second reactor unit 750 can include multiple reactors in series. The reaction residence time in second reactor unit 750 can be between 10 seconds and 60 minutes and alternately between 5 min and 30 min. The reaction residence time in second reactor unit 750 is determined by assuming the density of the internal fluid is that of water at the conditions of the reactor. In at least one embodiment, reaction residence time in second reactor unit 750 is greater than the reaction residence time in first reactor unit 700. The temperature in second reactor unit 750 can be at least 20° C. less than the temperature of first reactor unit 700, alternately at least 50° C. less than the temperature of first reactor unit 700, and alternately between 15° C. and 55° C. less than the temperature of first reactor unit 700. The temperature in second reactor unit 750 is greater than the critical temperature of water. The temperature in second reactor unit 750 is measured by measuring the temperature of the fluid at the reactor outlet. The pressure of second reactor unit 750 can be greater than the critical pressure of water, alternately between 23 MPa and 30 MPa, and alternately between 23 MPa and 28 MPa. Second reactor unit 750 can be in the absence of an external supply of catalyst. Second reactor unit 750 can be in the absence of an external supply of hydrogen. The dimensions of second reactor unit 750 can be designed to have a Reynolds number over 4,000 calculated by assuming the internal fluid is water. Second reactor unit 750 is in the absence of an external supply of catalyst. Second reactor unit 750 is in the absence of an external supply of hydrogen.

The oil in cooled mixed outlet 75 can undergo conversion reactions in second reactor unit 750 to produce upgraded bio-oil and upgraded heavy oil. Unreacted oxygenates in reactor outlet 65 can be treated in second reactor unit 750 because the heavy oil can provide a sufficient amount of radicals and hydrogen to react with the oxygenates. Additionally, sulfur compounds from the heavy oil can improve breaking of carbon-oxygen bonds of the heavy oil and bio-oil by substitution reactions. The fluid in second reactor unit 750 can exit as product effluent 80. Product effluent 80 can be introduced to separation unit 600.

In at least one embodiment, the process to produce an upgraded oil blend can be in the absence of heat exchanger 400 between first reactor unit 700 and second reactor unit 750 and a heat exchanger can be positioned downstream of second reactor unit 750. In such embodiments, mixed reactor outlet 55 can be introduced to a filter or to second reactor unit 750 directly and product effluent 80 can be introduced to the heat exchanger.

In each of the embodiments described here, the total volumetric flow rate of oil is less than 50% of the total overall volumetric flow rate of water and oil, such that the volumetric flow rate of water is greater than the total volumetric flow rate of oil.

Advantageously, mixing heavy oil feed 10 and bio-oil feed 40 in different mixers, as shown in FIG. 1 and FIG. 3, can induce better mixing due to the intervention of supercritical water, which can improve the miscibility of the heavy oil feed 10 and the bio-oil feed 40.

EXAMPLES

The Example is a simulated analysis of the process according to the process described with reference to FIG. 2. The simulation was prepared using Aspen-HYSYS based on experimental data drawn from experimental runs in a pilot plant. Heavy oil feed 10 was modeled as an atmospheric residue/reduced crude oil. Bio-oil feed 40 was modeled as a product from wood pyrolysis. The properties of both are shown in Table 1.

TABLE 1

Properties of heavy oil feed 10 and bio-oil feed 40

| Property | Units | Heavy Oil Feed 10 | Bio-oil feed 40 |
|---|---|---|---|
| Moisture Content | wt % | 0.1 | 17 |
| pH | | — | 2.5 |
| Specific Gravity | | 0.98 | 1.2 |
| HHV | MJ/kg | 40 | 17 |
| Viscosity @ 50° C. | cP | 1219 | 80 |
| Elemental Composition | | | |
| Carbon | wt % | 84 | 56 |
| Hydrogen | wt % | 11 | 6.4 |
| Oxygen | wt % | 1 | 35.4 |
| Nitrogen | wt % | 0.23 | 0.21 |
| Sulfur | wt % | 4 | 0.1 |

The flow rate of bio-oil feed 40 into first stage mixer 100 was 2 liters/min at a pressure of 27 MPa and a temperature of 295° C. The flow rate of supercritical water 20 into first stage mixer 200 was 4 liters/min at a pressure of 27 MPa and a temperature of 400° C. Bio-oil emulsion 35 was introduced to supercritical reactor 300. Supercritical reactor 300 was operated at a temperature of 450° C. and a pressure of 27 MPa with a residence time of about 4 minutes. Reactor outlet 65 was mixed with heavy oil feed 10 in second stage mixer 200, where heavy oil feed 10 had a flow rate of 2 liters/min at a pressure of 27 MPa and a temperature of 245° C. Mixed reactor outlet 55 as introduced to second reactor unit 750. Second reactor unit 750 was operated at a temperature of 400° C. and 27 MPa. Product effluent 80 can be cooled to a temperature of 90° C. and depressurized to 0.1013 MPa. The cooled and depressurized effluent was then introduced to separation unit 600, which consisted of gas-liquid separator 610 and oil-water separator 620, to produce upgraded oil blend 90, gas product 92, and recovered water 94. The stream properties of upgraded oil blend are shown in Table 2.

TABLE 2

Stream Properties of Upgraded Oil Blend 90

| Physical Property | | Upgraded Oil Blend 90 |
|---|---|---|
| Liquid Yield | wt % | 88 |
| Moisture Content | wt % | 1.5 |
| Specific gravity | | 0.97 |
| HHV | MJ/kg | 41 |
| Viscosity @ 50° C. | cP | 124 |
| Elemental Composition | | |
| Carbon | wt % | 83 |
| Hydrogen | wt % | 11 |
| Oxygen | wt % | 4.9 |
| Nitrogen | wt % | 0.12 |
| Sulfur | wt % | 0.06 |

The properties of upgraded oil blend 90 show that the oil is a dry oil with a reduced oxygen content and reduced sulfur content. The hydrogen to carbon ratio in upgraded oil blend 90 makes it suitable for use as a fuel. Additionally, the liquid yield is high.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed is:

1. A process for producing an upgraded oil blend, the process comprising the steps of:
   introducing a combined stream to a supercritical reactor, wherein a volumetric ratio of water to oil in the combined stream is in the range between 10:1 and 2:1, wherein oil comprises heavy oil and bio-oil;
   reacting the combined stream in the supercritical water reactor to produce a reactor effluent, wherein the supercritical reactor is at a temperature between 390° C. and 450° C. and a pressure between 23 MPa and 27 MPa, wherein supercritical water reactor is in the absence of an external supply of catalyst, wherein the oil undergoes conversion reactions in the supercritical reactor such that the reactor effluent comprises upgraded bio-oil and upgraded heavy oil;
   introducing the reactor effluent to a heat exchanger;
   reducing a temperature of the reactor effluent to produce a cooled effluent, wherein the cooled effluent is at a temperature between 250° C. and 350° C.;
   introducing the cooled effluent to a soaker;
   operating the soaker to produce a product effluent, wherein a temperature in the soaker is between 250° C. and 350° C., wherein decarboxylation reactions occur in the soaker, wherein conversion reactions occur in the soaker;
   introducing the product effluent to a separation unit; and
   separating the product effluent in the separation unit to produce a gas product, a recovered water, and the upgraded oil blend, wherein the upgraded oil blend comprises upgraded bio-oil and upgraded heavy oil.

2. The process of claim 1, further comprising the steps of:
   introducing supercritical water to a first stage mixer, wherein the supercritical water comprises supercritical water;
   introducing a bio-oil feed to the first stage mixer, wherein the bio-oil feed comprises bio-oil, wherein a temperature of the bio-oil feed is less than 300° C. and a pressure is between 23 MPa and 27 MPa;
   mixing the supercritical water and the bio-oil feed in the first stage mixer to produce a bio-oil emulsion;
   introducing the bio-oil emulsion to a second stage mixer;
   introducing a heavy oil feed to the second stage mixer, wherein the heavy oil feed comprises heavy oil, wherein a temperature of the heavy oil feed is less than 250° C. and a pressure is between 23 MPa and 27 MPa; and
   mixing the bio-oil emulsion and the heavy oil feed in the second stage mixer to produce the combined stream.

3. The process of claim 1, further comprising the steps of:
   introducing a supercritical water to the first stage mixer, wherein the supercritical water comprises supercritical water;
   introducing a heavy oil feed to a first stage mixer, wherein the heavy oil feed comprises heavy oil, wherein a temperature of the heavy oil feed is less than 250° C. and a pressure is between 23 MPa and 27 MPa;
   mixing the supercritical water and the heavy oil feed in the first stage mixer to produce an oil-water emulsion;
   introducing the oil-water emulsion to a second stage mixer;
   introducing a bio-oil feed to the second stage mixer, wherein the bio-oil feed comprises bio-oil, wherein a temperature of the bio-oil feed is less than 300° C. and a pressure is between 23 MPa and 27 MPa; and
   mixing the heavy oil emulsion and the bio-oil feed in the second stage mixer to produce the combined stream.

4. The process of claim 1, further comprising the steps of:
   introducing a bio-oil feed to a first stage mixer, wherein the bio-oil feed comprises bio-oil, wherein a temperature of the bio-oil feed is less than 300° C. and a pressure is between 23 MPa and 27 MPa;
   introducing a heavy oil feed to the first stage mixer, wherein the heavy oil feed comprises heavy oil, wherein a temperature of the heavy oil feed is less than 250° C. and a pressure is between 23 MPa and 27 MPa;
   mixing the bio-oil feed and the heavy oil feed in the first stage mixer to produce a mixed oil;
   introducing the mixed oil to a second stage mixer;
   introducing a supercritical water to the second stage mixer, wherein the supercritical water comprises supercritical water; and
   mixing the mixed oil emulsion and the supercritical water in the second stage mixer to produce the combined stream.

5. The process of claim 1, wherein the step of separating the product effluent in the separation unit comprises the steps of:
   introducing the soaker effluent to a gas-liquid separator;
   separating the soaker effluent to produce a gas product and a liquid stream;
   introducing the liquid stream to an oil-water separator;
   separating the liquid stream to produce the upgraded oil blend and the recovered water.

6. The process of claim 2, wherein the bio-oil feed comprises bio-oil produced from a biomass raw material, wherein the biomass raw material is selected from the group consisting of lignocellulosic biomass, herbaceous biomass, fine algae, large algae, food biomass, agricultural waste, municipal waste, sunflower oil, palm oil, canola oils, and combinations of the same.

7. The process of claim 2, wherein the heavy oil in the heavy oil feed is selected from the group consisting of atmospheric distillation residue, vacuum distillation residue, residue streams from refinery, petrochemical plants, and coal liquefaction streams, upgraded oil blends recovered from oil or tar sands, bituminous oils, hydrocarbon streams from oil refinery processes, product streams from steam cracking processes, and combinations of the same.

8. The process of claim 2, wherein the heavy oil feed is in the absence of bio-oil.

9. The process of claim 2, further comprising the steps of:
increasing a pressure of a heavy oil stream in a heavy oil pump to produce a pressurized heavy oil, wherein the pressurized heavy oil is at a pressure between 23 MPa and 27 MPa;
increasing a temperature of the pressurized heavy oil in a heavy oil heater to produce the heavy oil feed;
increasing a pressure of a bio-oil stream in a bio-oil pump to produce a pressurized bio-oil, wherein the pressurized bio-oil is at a pressure between 23 MPa and 27 MPa;
increasing a temperature of the pressurized bio-oil in a bio-oil heater to produce the bio-oil feed;
increasing a pressure of a water feed to produce a pressurized water, wherein the pressurized water is at a pressure between 23 MPa and 27 MPa; and
increasing a temperature of the pressurized water to produce the supercritical water, wherein the supercritical water is at a temperature between 400° C. and 550° C.

10. The process of claim 3, further comprising the steps of:
increasing a pressure of a heavy oil stream in a heavy oil pump to produce a pressurized heavy oil, wherein the pressurized heavy oil is at a pressure between 23 MPa and 27 MPa;
increasing a temperature of the pressurized heavy oil in a heavy oil heater to produce the heavy oil feed;
increasing a pressure of a bio-oil stream in a bio-oil pump to produce a pressurized bio-oil, wherein the pressurized bio-oil is at a pressure between 23 MPa and 27 MPa;
increasing a temperature of the pressurized bio-oil in a bio-oil heater to produce the bio-oil feed;
increasing a pressure of a water feed to produce a pressurized water, wherein the pressurized water is at a pressure between 23 MPa and 27 MPa; and
increasing a temperature of the pressurized water to produce the supercritical water, wherein the supercritical water is at a temperature between 400° C. and 550° C.

11. A system for producing an upgraded oil blend comprising:
a supercritical reactor, the supercritical reactor configured to maintain reactions of a combined stream to produce a reactor, wherein a volumetric ratio of water to oil in the combined stream is in the range between 10:1 and 2:1, wherein oil comprises heavy oil and bio-oil, wherein the supercritical reactor is at a temperature between 390° C. and 450° C. and a pressure between 23 MPa and 27 MPa, wherein supercritical water reactor is in the absence of an external supply of catalyst, wherein the oil undergoes conversion reactions in the supercritical reactor such that the reactor effluent comprises upgraded bio-oil and upgraded heavy oil;
a heat exchanger fluidly connected to the supercritical reactor, the heat exchanger configured to reduce a temperature of the reactor effluent to produce a cooled effluent, wherein the cooled effluent is at a temperature between 250° C. and 350° C.;
a soaker fluidly connected to a heat exchanger, the soaker configured to maintain reactions of the cooled effluent to produce a product effluent, wherein a temperature in the soaker is between 250° C. and 350° C., wherein decarboxylation reactions occur in the soaker, wherein conversion reactions occur in the soaker; and
a separation unit, the separation unit configured to separate the product effluent to produce a gas product, a recovered water, and the upgraded oil blend, wherein the upgraded oil blend comprises upgraded bio-oil and upgraded heavy oil.

12. The system of claim 11, further comprising:
a first stage mixer configured to mix supercritical water and a bio-oil feed to produce a bio-oil emulsion, wherein the supercritical water comprises supercritical water, wherein the bio-oil feed comprises bio-oil, wherein a temperature of the bio-oil feed is less than 300° C. and a pressure is between 23 MPa and 27 MPa; and
a second stage mixer fluidly connected to the first stage mixer, the second stage mixer configured to mix the bio-oil emulsion and a heavy oil feed to produce the combined stream, wherein the heavy oil feed comprises heavy oil, wherein a temperature of the heavy oil feed is less than 250° C. and a pressure is between 23 MPa and 27 MPa.

13. The system of claim 11, further comprising:
a first stage mixer configured to mix supercritical water and a heavy oil feed to produce an oil-water emulsion, wherein the supercritical water comprises supercritical water, wherein the heavy oil feed comprises heavy oil, wherein a temperature of the heavy oil feed is less than 250° C. and a pressure is between 23 MPa and 27 MPa; and
a second stage mixer fluidly connected to the first stage mixer, the second stage mixer configured to mix the oil-water emulsion and a bio-oil feed to produce the combined stream.

14. The system of claim 11, further comprising:
a first stage mixer configured to mix a bio-oil feed and a heavy oil feed to produce a mixed oil, wherein the bio-oil feed comprises bio-oil, wherein a temperature of the bio-oil feed is less than 300° C. and a pressure is between 23 MPa and 27 MPa, wherein the heavy oil feed comprises heavy oil, wherein a temperature of the heavy oil feed is less than 250° C. and a pressure is between 23 MPa and 27 MPa; and
a second stage mixer fluidly connected to the first stage mixer, the second stage mixer configured to mix the mixed oil and a supercritical water, wherein the supercritical water comprises supercritical water.

15. The system of claim 11, wherein the separation unit comprises:
a gas-liquid separator, the gas-liquid separator configured to separate the soaker effluent to produce a gas product and a liquid stream; and
an oil-water separator fluidly connected to the gas-liquid separator, the oil-water separator configured to separate the liquid stream to produce the upgraded oil blend and the recovered water.

16. The system of claim 12, further comprising:
a heavy oil pump, the heavy oil pump configured to increase a pressure of a heavy oil stream to produce a pressurized heavy oil, wherein the pressurized heavy oil is at a pressure between 23 MPa and 27 MPa;
a heavy oil heater fluidly connected to the heavy oil pump, the heavy oil heater configured to increase a temperature of the pressurized heavy oil to produce the heavy oil feed;
a bio-oil pump, the bio-oil pump configured to increase a pressure of a bio-oil stream to produce a pressurized bio-oil, wherein the pressurized bio-oil is at a pressure between 23 MPa and 27 MPa;
a bio-oil heater fluidly connected to the bio-oil pump, the bio-oil heater configured to increase a temperature of the pressurized bio-oil to produce the bio-oil feed;
a water pump, the water pump configured to increase a pressure of a water feed to produce a pressurized water, wherein the pressurized water is at a pressure between 23 MPa and 27 MPa; and
a water heater fluidly connected to the water pump, the water heater configured to increase a temperature of the pressurized water to produce the supercritical water, wherein the supercritical water is at a temperature between 400° C. and 550° C.

17. The system of claim 13, further comprising:
a heavy oil pump, the heavy oil pump configured to increase a pressure of a heavy oil stream to produce a pressurized heavy oil, wherein the pressurized heavy oil is at a pressure between 23 MPa and 27 MPa;
a heavy oil heater fluidly connected to the heavy oil pump, the heavy oil heater configured to increase a temperature of the pressurized heavy oil to produce the heavy oil feed;
a bio-oil pump, the bio-oil pump configured to increase a pressure of a bio-oil stream to produce a pressurized bio-oil, wherein the pressurized bio-oil is at a pressure between 23 MPa and 27 MPa;
a bio-oil heater fluidly connected to the bio-oil pump, the bio-oil heater configured to increase a temperature of the pressurized bio-oil to produce the bio-oil feed;
a water pump, the water pump configured to increase a pressure of a water feed to produce a pressurized water, wherein the pressurized water is at a pressure between 23 MPa and 27 MPa; and
a water heater fluidly connected to the water pump, the water heater configured to increase a temperature of the pressurized water to produce the supercritical water, wherein the supercritical water is at a temperature between 400° C. and 550° C.

18. The system of claim 11, wherein the first stage mixer is selected from the group consisting of a t-junction, an inline mixer, and a combination of the same, wherein the second stage mixer is selected from the group consisting of a t-junction, an inline mixer, and combination of the same.

19. A process to produce an upgraded oil blend, the process comprising the steps of:
introducing a portion of supercritical water to a first stage mixer, wherein the supercritical water comprises supercritical water;
introducing a bio-oil feed to the first stage mixer, wherein the bio-oil feed comprises bio-oil, wherein a temperature of the bio-oil feed is less than 300° C. and a pressure is between 23 MPa and 27 MPa;
mixing the supercritical water and the bio-oil feed in the first stage mixer to produce a bio-oil emulsion;
introducing the bio-oil emulsion to a first reactor unit;
reacting the bio-oil emulsion in the first reactor unit to produce a reactor outlet, where in the first reactor unit is at a temperature between 390° C. and 450° C. and a pressure between 23 MPa and 27 MPa, wherein the first reactor unit comprises a catalyst layer;
introducing the reactor outlet to a second stage mixer;
introducing a heavy oil feed to the second stage mixer, wherein the heavy oil feed comprises heavy oil, wherein a temperature of the heavy oil feed is less than 250° C. and a pressure is between 23 MPa and 27 MPa;
introducing the remainder of the supercritical water to the second stage mixer;
mixing the reactor outlet and the heavy oil feed in the second stage mixer to produce a mixed reactor outlet, wherein a volumetric ratio of water to oil in the mixed reactor outlet is in the range between 10:1 and 2:1, wherein oil comprises heavy oil, upgraded bio-oil, and bio-oil;
introducing the mixed reactor outlet to a heat exchanger;
reducing a temperature of the mixed reactor outlet to produce a cooled mixed outlet, wherein a temperature of the cooled mixed outlet is between 20° C. and 50° C. less than the temperature of the first reactor unit;
introducing the cooled mixed outlet to a second reactor unit;
reacting the mixed reactor outlet in the second reactor unit to produce a product effluent, wherein the second reactor unit is at a temperature between 20° C. and 50° C. less than the temperature in first reactor unit and a pressure between 23 MPa and 27 MPa, wherein supercritical water reactor is in the absence of an external supply of catalyst, wherein the oil undergoes conversion reactions in the supercritical reactor such that the product effluent comprises upgraded bio-oil and upgraded heavy oil;
introducing the product effluent to a separation unit; and
separating the product effluent in the separation unit to produce a gas product, a recovered water, and the upgraded oil blend, wherein the upgraded oil blend comprises upgraded bio-oil and upgraded heavy oil.

20. The process of claim 19 further comprising the steps of:
increasing a pressure of a heavy oil stream in a heavy oil pump to produce a pressurized heavy oil, wherein the pressurized heavy oil is at a pressure between 23 MPa and 27 MPa;
increasing a temperature of the pressurized heavy oil in a heavy oil heater to produce the heavy oil feed;
increasing a pressure of a bio-oil stream in a bio-oil pump to produce a pressurized bio-oil, wherein the pressurized bio-oil is at a pressure between 23 MPa and 27 MPa;
increasing a temperature of the pressurized bio-oil in a bio-oil heater to produce the bio-oil feed;
increasing a pressure of a water feed to produce a pressurized water, wherein the pressurized water is at a pressure between 23 MPa and 27 MPa; and
increasing a temperature of the pressurized water to produce the supercritical water, wherein the supercritical water is at a temperature between 400° C. and 550° C.

* * * * *